United States Patent
Kim (10) Patent No.: US 11,651,549 B2
(45) Date of Patent: May 16, 2023

(54) METHOD AND APPARATUS FOR GENERATING 3D ENTITY SHAPE DATA USING IMAGE RECOGNITION

(71) Applicant: VISION GRID, Seoul (KR)

(72) Inventor: Hang Sup Kim, Seoul (KR)

(73) Assignee: VISION GRID, Seoul (KR)

( * ) Notice: Subject to any disclaimer, the term of this patent is extended or adjusted under 35 U.S.C. 154(b) by 149 days.

(21) Appl. No.: 17/197,593

(22) Filed: Mar. 10, 2021

(65) Prior Publication Data

US 2022/0254100 A1    Aug. 11, 2022

(30) Foreign Application Priority Data

Feb. 9, 2021 (KR) .................. 10-2021-0018541

(51) Int. Cl.
*G06T 17/00* (2006.01)
*G06T 7/50* (2017.01)

(52) U.S. Cl.
CPC ................ *G06T 17/00* (2013.01); *G06T 7/50* (2017.01); *G06T 2200/04* (2013.01); *G06T 2200/08* (2013.01)

(58) Field of Classification Search
CPC . G06T 17/00; G06T 2200/04; G06T 2200/08; G06T 7/50
See application file for complete search history.

(56) References Cited

U.S. PATENT DOCUMENTS

2018/0095276 A1* 4/2018 Ng-Thow-Hing .... G06F 3/0308
2021/0383549 A1* 12/2021 Wang ...................... G06T 7/149

FOREIGN PATENT DOCUMENTS

KR    1020190048952 A    5/2019

\* cited by examiner

*Primary Examiner* — Sam Bhattacharya

(57) ABSTRACT

A method for generating 3D entity shape data using image recognition which is performed by a computing device, the method includes the steps of: recognizing a grid matching part having four edge vertices of a quadrangle displayed in an image captured by a camera; generating a cube-shaped 3D space grid of a specific distance unit applied to the image by using the grid matching part; and generating shape data for an external object using the 3D space grid.

7 Claims, 8 Drawing Sheets

METHOD AND APPARATUS FOR GENERATING 3D ENTITY SHAPE DATA USING IMAGE RECOGNITION

CROSS-REFERENCE TO RELATED APPLICATION

This application claims priority under 35 U.S.C. § 119(a) to Korean Patent Application No. 10-2021-0018541 filed in the Korean Intellectual Property Office on Feb. 9, 2021, the entire contents of which are incorporated herein by reference.

BACKGROUND (a) Technical Field

The present disclosure relates to a method and an apparatus for generating 3D entity shape data using image recognition.

(b) Background Art

A current technology for recognizing terrains or objects in the autonomous driving industry, etc. is basically a 2D form using 2D images. However, humans recognize all objects in 3D. Therefore, in order to approach the human level, it is necessary to configure all object data in 3D. However, in order to recognize an object in 3D, a distance of each part of the object needs to be measured, but the technology so far has the following limitations. First of all, radar or laser is mainly used, and in this case, as the number of vehicles increases, there is a possibility of interference and crosstalk. In addition, when a sensor is installed on the road, there is a problem that the construction cost increases. In addition, in the case of 3D cameras, errors have been severe so far, and the performance to adjust a focal length by moving freely like human eyes does not come out and mechanical wear is severe, thereby making it impossible to realize the performance with current technology. However, these methods are methods of firing or calculating something from the side to measure the object, and can replace the human eyes if distance information exists in the object itself.

However, as a method of a concept of installing distance information on an object, there is a method of measuring the road with a tape measure and painting the road like a checkerboard, but this method requires excessive cost. Also, even when drawing lines separately from the lanes on the road, the cost is excessively required. Therefore, there is a need for a method capable of measuring an exact distance while minimizing the cost. Not only simple distance measurement, but also information on the size of a fixed or movable object such as buildings may be used in various ways, so that it is also important to secure information on a 3D object. Finally, existing technologies do not definitely know information about a back side of an object. Humans predict and drive the size and shape of the back side of the vehicle, but an AI technology installed in the autonomous driving industry to date cannot predict an invisible back side at all.

In other words, as the technology of various industries has been developed, there are a lot of needs to create and manage complete real 3D information instead of a combination of several images in terrains and objects. In particular, in autonomous driving, vehicles or objects in the front and rear need be recognized in 3D, a map indicating roads and cities in 3D is required, and in the case of drones and augmented reality, 3D shape information of terrain features including buildings and mountains is required. There is a need to implement the industry that needs object recognition such as product inspection and testing, and finally, 3D data that includes raw data for expressing image contents including holograms to distance information of reality other than continuous images of 2D images. Therefore, in all these industries, there is a need to implement learning data for AI as complete 3D data to more accurately recognize objects.

In addition, 3D data that constitutes a space is large-capacity data that cannot be compared with existing 2D images or videos with continuous 2D images in terms of data quantity, and a need to effectively reduce the capacity is also raised.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

Therefore, the present disclosure is derived to solve the problems, and an object of the present disclosure is to provide a method and an apparatus for generating 3D entity shape data using image recognition capable of more accurately measuring 3D shape information on an object while minimizing the construction cost.

Other objects of the present disclosure will become clearer through preferred embodiments to be described below.

According to an aspect of the present disclosure, there is provided a method for generating 3D entity shape data using image recognition which is performed by a computing device, the method including the steps of: recognizing a grid matching part having four edge vertices of a quadrangle displayed in an image captured by a camera; generating a cube-shaped 3D space grid of a specific distance unit applied to the image by using the grid matching part; and generating shape data for an external object using the 3D space grid.

A virtual grid on a plane of a specific distance may be first generated by using the grid matching part, and the 3D space grid may be generated by matching a lower surface of a virtual 3D grid having a plurality of cubes with the virtual grid.

The grid matching part may be formed in a 3D shape having three axes x, y, and z, and the 3D space grid may be generated by matching one cube of the virtual 3D grid with the grid matching part.

The generating of the shape data for the external object may include obtaining real coordinates, sizes, and distances of feature points of a main outline of the object by using the 3D space grid; and generating a small quadrangular grid (polygon) on the object surface by using the coordinates of the feature points of the main outline.

When the outline of the object is curved, a smaller quadrangular grid may be generated.

The method may further include generating each set of points expressed as a quadrangle or more grid (polygon) object having the same distance of a small side on the object surface by using the coordinates of the feature points of the main outline obtained by using the 3D space grid in each of images captured in two or more points to complete an invisible part by attaching the generated sets using a real coordinate. A 3D coordinate may be completed by generating a virtual planar grid that vertically or horizontally cuts the cross section of the object where feature points of the main outline of the object are located, and obtaining the coordinates of the virtual planar grid.

According to another aspect of the present disclosure, there is provided an apparatus for generating 3D entity shape data using image recognition, the apparatus including: a processor; and a memory connected to the processor, wherein the memory stores program instructions executable by the processor to recognize a grid matching part having four edge vertices of a quadrangle displayed in an image captured by a camera, generate a cube-shaped 3D space grid of a specific distance unit applied to the image by using the grid matching part, and generate shape data for an external object using the 3D space grid.

According to the present disclosure, vehicles or other devices can acquire information on a 3D shape of the object only with images from a camera by performing only a simple display on the road or surrounding buildings or other objects, thereby reducing construction costs.

It should be understood that the effects of the present disclosure are not limited to the effects described above, but include all effects that can be deduced from the detailed description of the present disclosure or configurations of the disclosure described in appended claims.

DETAILED DESCRIPTION

The present disclosure may have various modifications and various embodiments and specific embodiments will be illustrated in the drawings and described in detail in the detailed description. However, this does not limit the present disclosure to specific embodiments, and it should be understood that the present disclosure covers all the modifications, equivalents and replacements included within the idea and technical scope of the present disclosure.

It should be understood that, when it is described that a component is "coupled" or "connected" to the other component, the component may be directly coupled or connected to the other component, but there may be another component therebetween. In contrast, it should be understood that, when it is described that a component is "directly coupled" or "directly connected" to the other component, it is understood that no component is present therebetween.

Terms including as first, second, and the like may be used for describing various components, but the components are not limited by the terms. The terms are used only to discriminate one component from another component. For example, terms such as a first threshold value and a second threshold value to be described below are substantially different from each other or some values may be pre-designated as threshold values that are the same values, but when expressed in the same word as the threshold value, there is a room for confusion, and thus, for the convenience of classification, terms such as first and second will be used together.

Terms used in the present specification are used only to describe specific embodiments, and are not intended to limit the present disclosure. A singular form may include a plural form unless otherwise clearly indicated in the context. In this specification, it should be understood that term "including" or "having" indicates that a feature, a number, a step, an operation, a component, a part or the combination thereof described in the specification is present, but does not exclude a possibility of presence or addition of one or more other features, numbers, steps, operations, components, parts or combinations, in advance.

In addition, components of the embodiments described with reference to each drawing are not limitedly applied only to the corresponding embodiments, but may be implemented to be included in other embodiments within the scope in which the technical spirit of the present disclosure is maintained. In addition, even if a separate description is omitted, it is natural that a plurality of embodiments may be implemented again as one integrated embodiment.

In addition, in the description with reference to the accompanying drawings, like components designate like reference numerals regardless of reference numerals and a duplicated description thereof will be omitted. In describing the present disclosure, a detailed description of related known technologies will be omitted if it is determined that they unnecessarily make the gist of the present disclosure unclear.

Figure 1:
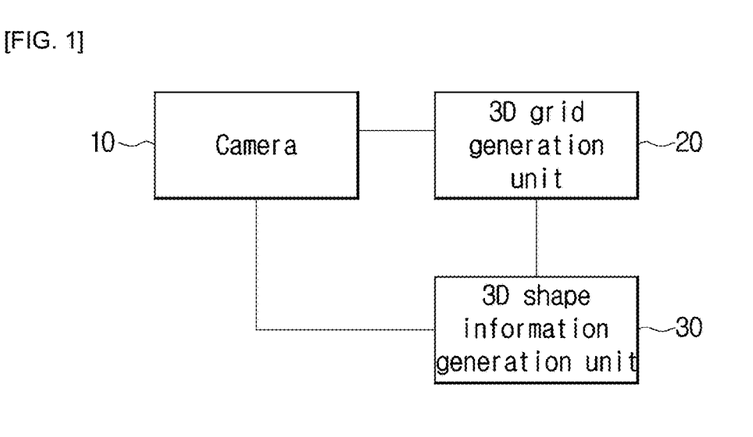
FIG. 1 is a block diagram illustrating a configuration of a 3D entity shape data apparatus using image recognition according to an embodiment of the present disclosure.

FIG. 1 is a block diagram illustrating a configuration of a 3D entity shape data apparatus using image recognition according to an embodiment of the present disclosure.

As illustrated in FIG. 1, the entire system according to the embodiment includes a camera 10, a 3D grid generation unit 20, and a 3D shape information generation unit 30.

The camera 10 captures an external 3D object. For example, the camera 10 is installed at various locations such as the front, rear, and side of a vehicle to capture an object such as buildings and the like on the road.

The 3D grid generation unit 20 generates cube-shaped 3D virtual grids having a plurality of hexahedrons in the image captured by the camera.

The 3D shape information generation unit 30 generates 3D shape data for the size of an arbitrary object in the image using 3D virtual grids.

Hereinafter, the 3D virtual grids and the 3D shape data will be described in more detail.

Figure 2:
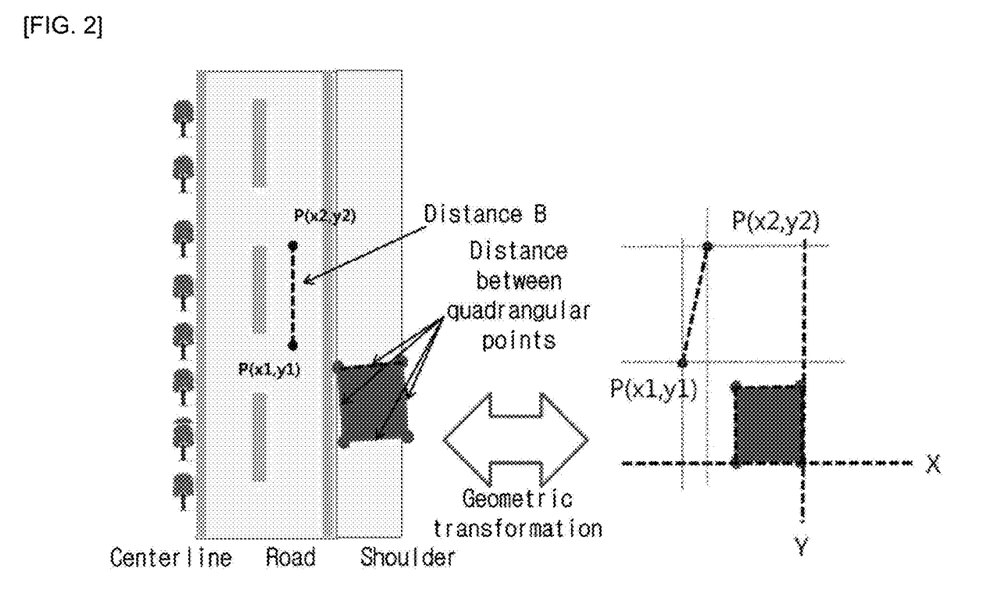
FIG. 2 is a diagram for describing distance measurement using a grid matching part according to an embodiment of the present disclosure.
Figure 3:
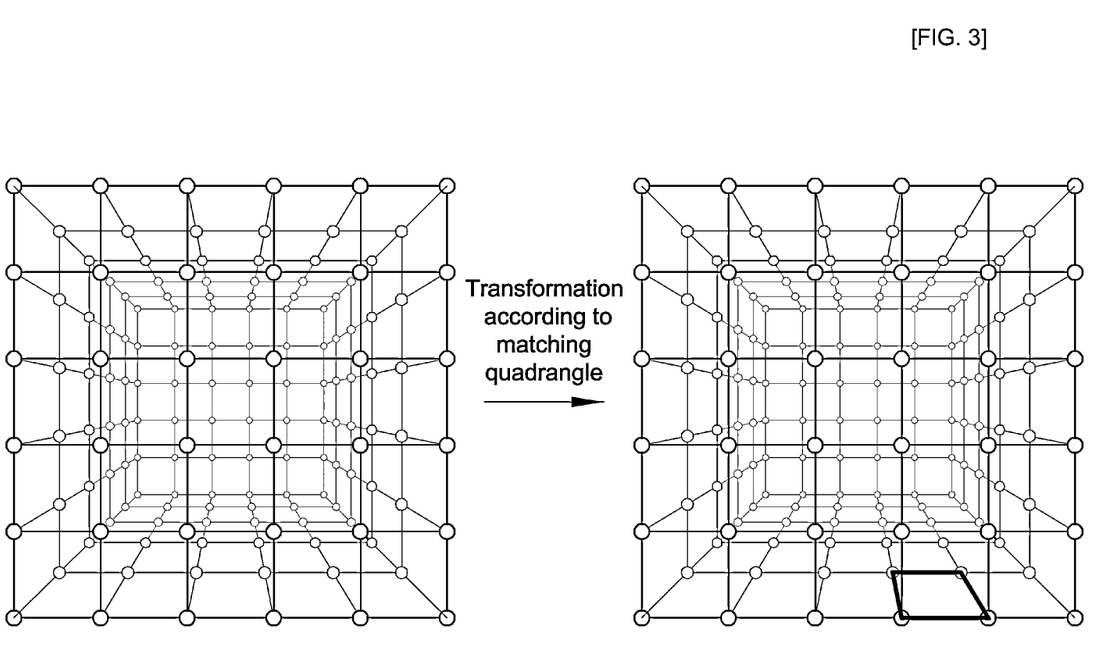
FIGS. 3 and 4 are exemplary diagrams illustrating a method for generating 3D space grids according to each embodiment of the present disclosure.
Figure 4:
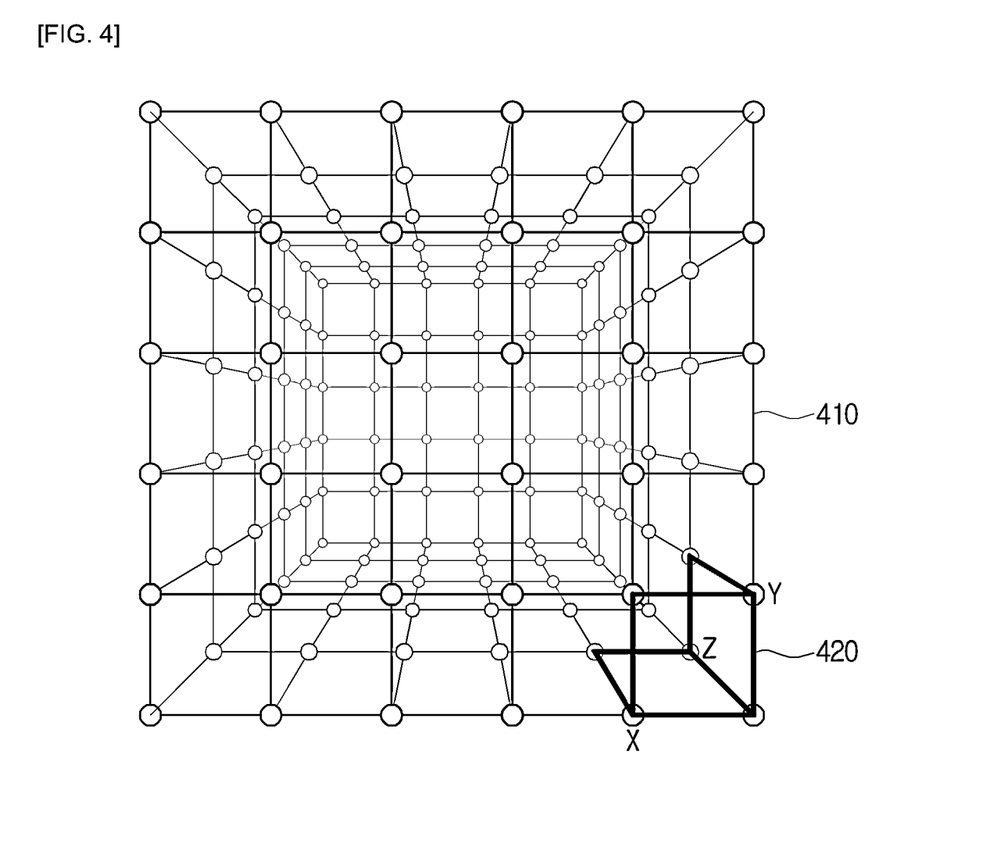

FIG. 2 is a diagram for describing distance measurement using a 2D grid matching part according to an embodiment of the present disclosure and FIGS. 3 and 4 are exemplary diagrams illustrating a method for generating 3D space grids according to each embodiment of the present disclosure.

First, referring to FIG. 2, if a grid matching part such as quadrangular points that can determine a distance such as 1 meter on the road is installed or measured, an actual distance between two different points may be measured by perspective transformation. At this time, it is preferable to dispose a quadrangular grid matching part parallel to a traveling direction of the road. Depending on a road environment, edges displayed on a screen may not match the positions of the grid matching part arranged on the road.

In addition, the quadrangle of the grid matching part can be rectangular, but if possible, the precision is high if the quadrangle is a perfect square. The reason is that when a length and a width are different from each other, a slight error occurs when an image is captured in a form twisted by transformation.

In addition, referring to FIG. 3, a virtual grid (hereinafter referred to as a 3D virtual grid) having a cube shape obtained by three-dimensionalizing coordinates of the grid is generated to a 3D space grid through geometric transformation using a planar virtual grid. The corresponding 3D virtual grid is moved to the grid matching quadrangle to match four edges with the edges of the grid matching part arranged on the road or plane, and accordingly, the grid extracted by geometric transformation is transformed into a virtual grid suitable for the actual road environment. This may be defined as a homogeneous transformation process. Also, the process is the same to be generated based on the edges of the grid from the beginning.

In addition, an advantage of creating grid lines is to be easily visually identified and be verifiable, and when the matching quadrangle becomes inaccurate when the image is captured blurredly by shaking of the camera, the grid lines are used to be parallel to a straight boundary line of the object or area (actual environment). In this case, there are advantages of reducing errors and ease of verification. A Z-axis proceeds in the same direction toward a vanishing point (a point that meets one place when gazing at the front) rather than a simple parallel with a straight boundary line or a main moving direction of the object and aligned to be met at the vanishing point, not parallel to a screen pixel.

In using such a grid line, a 3D space grid may be generated more accurately by matching the vanishing point of the virtual grid and the vanishing point of the virtual 3D grid while aligning one side of the quadrangle of the virtual grid with the bottom of the cube of the virtual 3D grid.

In addition, referring to FIG. 4 according to another example, when a grid matching part 420 provided on the road is three-dimensionally placed or is formed in a shape of a square hexahedron having 3D X, Y, Z-axial planes consisting of a square, a 3D space grid 410 may be generated more precisely. The size or distance property of a specific object may be obtained by using such a 3D space grid in space.

By using such a 3D space grid, information on a 3D shape, such as a shape and size, and the like of an object in reality, may be measured, and this information as 3D information may be variously used as 3D data in a computer environment.

As technologies in various industries have been developed, there is a need to generate and manage real 3D information such as terrains, objects, and the like. For example, autonomous driving requires a map that displays roads and cities in 3D, while drones require 3D shape information on topographic features including buildings and mountains. In augmented reality, 3D information of objects inside cities and buildings is required, and in order to represent a 3D hologram, 3D models such as height, depth, and volume, which are 3D spatial information of other real objects, and their actual size information are needed more precisely.

Even if a computer image is implemented in 3D, the image is only a 2D image and does not accurately contain information such as distances in x, y, and z axes or the size of a building. In addition, a rear portion that is not visible in an actual picture expressed as an image and not captured is not expressed in 3D.

On the other hand, by a 3D modeling program such as CAD, the distances in x, y, and z axes and the 3D model may be expressed as polygons, but since there is no information on the actual size and distance, even if the shape is similar, a completely different object may not be distinguished depending on the size. Therefore, in order to implement a real object by itself, it is necessary to measure the size and distance again and extract size and distance information as data. In order to accurately represent the real object, it is necessary to measure each part with a tape measure.

The size of the real data is expressed differently according to the camera type and the distance, and if a cup size is 10 cm, a model should be made in 10 cm regardless of using any camera. Therefore, a model of the same size of the object itself is needed considering the distance. In addition, since a method of using GPS in augmented reality lacks precision, the method is limited to a level of expressing coordinates in reality of the ground surface or finding a certain point within a building. As another method, in autonomous driving, a 3D shape of an object using a lidar or radar may be expressed, but an error rate is large and problems such as interference occur.

As a result, as a technology for augmented reality, a technology that measures reality and transforms the reality into a 3D object in a computer environment is not yet fully equipped in terms of precision.

Finally, when learning AI for object recognition, objects are mostly classified based on images captured in 2D, but the object itself is learned on the data implemented in 3D like as humans recognize and then recognized based thereon, thereby more accurately recognizing the object.

Hereinafter, a cell-based polygon unit configuration method using a 3D space grid will be described.

Assuming that a 3D image is implemented on a 2D image captured by a camera, a concept of sampling or compression of coordinates is required as a problem of too much data when implementing to have all the actual positions of individual pixels. In addition, since the actual distance (size) per individual pixel also varies according to a camera resolution and a distance from the camera, coordinates are obtained based on a kind of standardized quadrangular or polygonal cell, and one individual cell unit is required. It is possible to construct the shape information of the object if the object has not all the data of lines like the result of CAD, but only a set of vertices of a crossing quadrangle or more as data.

Figure 5:
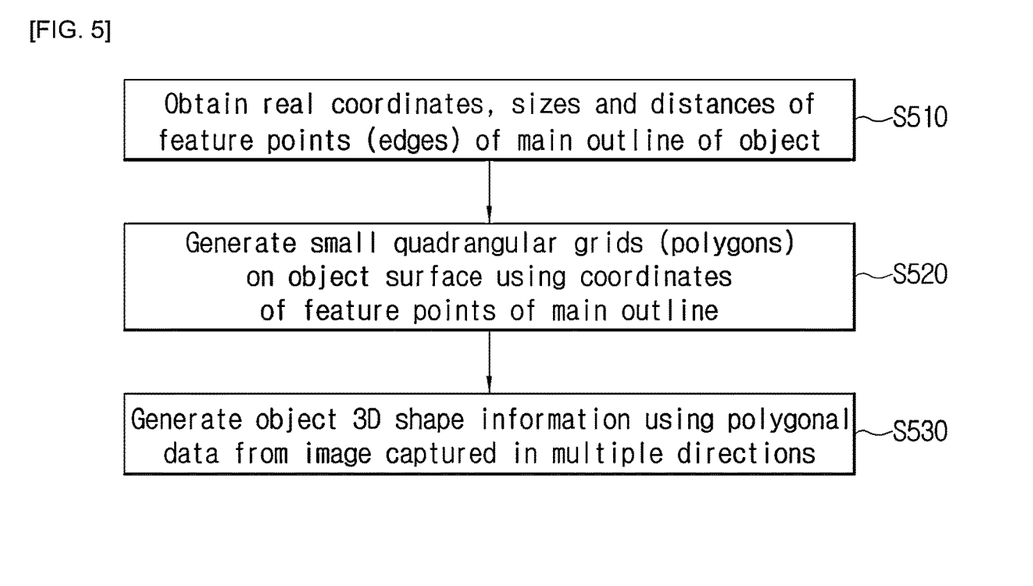
FIG. 5 is a flowchart illustrating a process of generating feature points and simple 3D data of an object using a matching quadrangle of the object according to an embodiment of the present disclosure.
Figure 6:
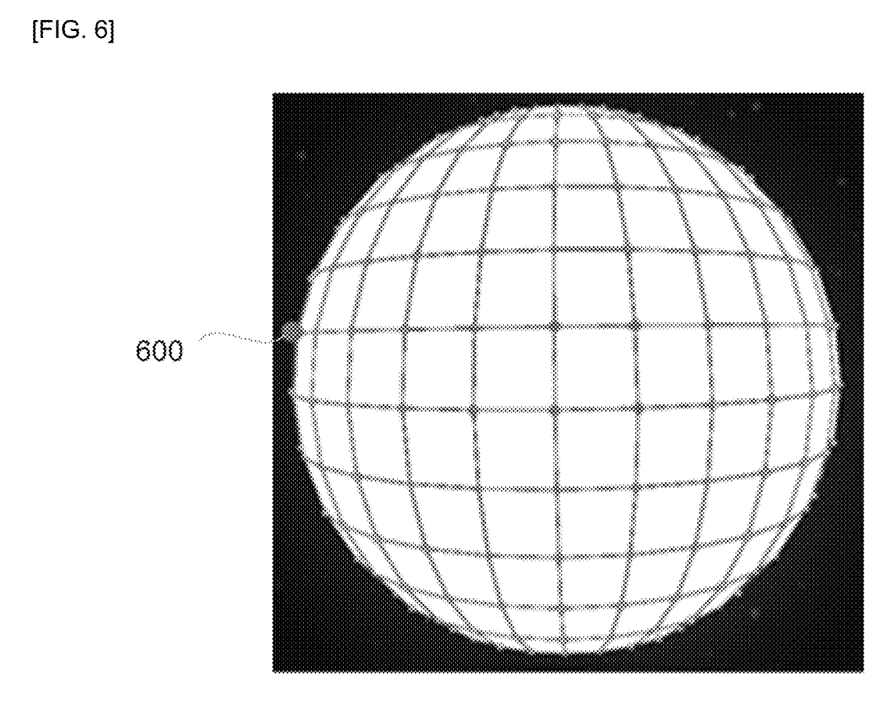
FIG. 6 is a diagram illustrating a 3D representation of a grid polygonal shape by combining polygonal points obtained by a distance from feature points of an object according to an embodiment of the present disclosure.

FIG. 5 is a flowchart illustrating a process of measuring a 3D shape using 3D space grids according to an embodiment of the present disclosure and FIG. 6 is an exemplary diagram illustrating a method of capturing and applying 3D space grids for an object having a curved outline in various directions according to an embodiment of the present disclosure.

Referring to FIG. 5, real coordinates, sizes, and distances of feature points (edges) of a main outline of an object are obtained (S510).

The outline of a specific object is extracted, and the main feature points that can indicate the approximate size of the object are obtained from the outline. At this time, the size (height, width) of the entire structure of the object and the building, the size of the part, and coordinates of the part forming the corresponding point are obtained.

At this time, since the coordinates on image pixels vary depending on a distance between the camera and the object, one core reference point of the object is mainly selected as a point at the bottom, and a coordinate of the point is obtained from a relative reference point in a region-specific reference point. The region-specific reference point is generated with a relative coordinate from another larger region-specific reference point. At this time, the coordinate is a 3D coordinate (3D coordinate in X, Y, and Z axes) and is a real converted coordinate, not a coordinate on the screen captured by the camera.

Based on the obtained reference point, the coordinates and distances (distances between X, Y, and Z axes) of primary feature points of the corresponding outlines are obtained by using a 3D space grid.

Figure 8:
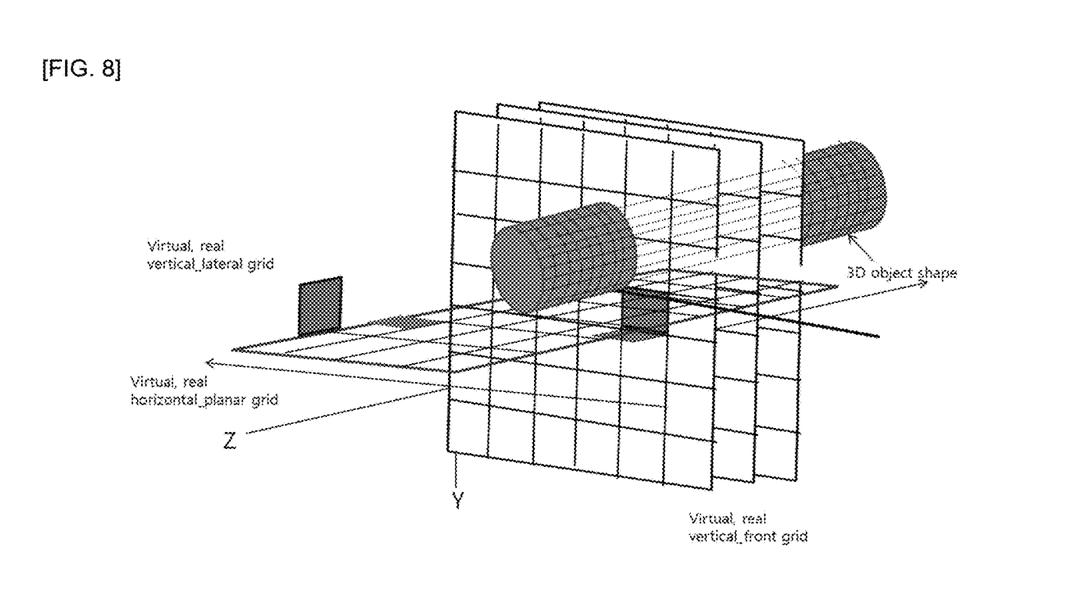
FIG. 8 is a diagram illustrating a case of using a method of obtaining coordinates from grids of a cross section obtained from a 3D shape of feature points of an object according to an embodiment of the present disclosure.
Figure 9:
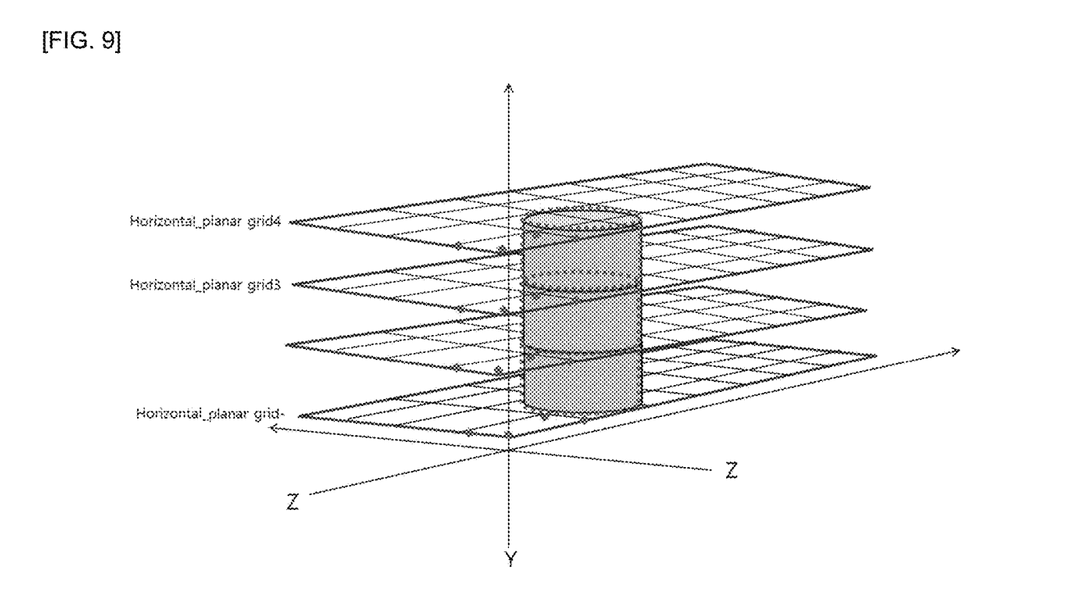
FIG. 9 is a diagram illustrating a process of measuring a 3D shape using 3D space grids according to an embodiment of the present disclosure.

Referring to FIG. 8 illustrating a detailed method of obtaining all 3D coordinates including feature points, a planar grid or a vertical grid that cuts a cross section of a target object passing through feature points is virtually generated from a cube-shaped 3D space grid, and the remaining 2D coordinates are obtained from the planar grid as in a method of FIG. 9.

Next, a coordinate group having a small quadrangular grid (polygon) shape is generated on the object surface by using the coordinates of the feature points of the main outline (S520).

3D data has a huge amount of data compared to 2D and thus needs to be compressed somehow. As a compressing method, as illustrated in FIG. 6, a relative coordinate from feature points or reference points is set as a real distance so that combinations of four or more points having the same distance between one sides form a group. In this way, grouping of polygonal points is performed on the entire object so that the groups of individual points are virtually connected to form a grid-shaped polygon cell structure when viewed.

At this time, in a method of obtaining the polygonal points of each cell, coordinates of points of a grid shape having four or more coordinates corresponding to the vertices of a virtually smaller sized quadrangle are generated by dividing the surface of the object into distance lines by a specific standard unit using the obtained coordinates of the feature points. For example, as illustrated in reference numeral 600 of FIG. 6, each polygonal point is obtained while moving in real spatial coordinates such as 1 cm or 10 cm.

As a detailed method of obtaining a group (grid cell) of polygonal points while moving in spatial coordinates, if the cross section of the object has a straight line and a plane, a virtual grid is generated to adjust the size, and in the obtained coordinates of the edges of this small quadrangle, actual 3D coordinates (3D coordinates of X, Y, and Z axes) are obtained. The actual 3D coordinates are obtained by geometric transformation using a 3D space grid.

Curved 3D polygons are generated more precisely by reducing the size of the grid for curved lines and curved parts of the object. The curved line is generated by a method of creating a curved texture of a model similar to the curve line of an object using an algorithm such as other circles, ellipses, and Bezier curves, and obtaining coordinates of the quadrangle using vertical and horizontal textures to add the obtained coordinates to the object data. The actual 3D coordinates are obtained by geometric transformation using a 3D space grid.

In the case of a curved surface, there is a method of obtaining the coordinates of the points of a quadrangle after drawing a curved shape according to the shape of an object, and another method of obtaining the coordinates of the curved surface by arranging smaller quadrangles.

Figure 10:
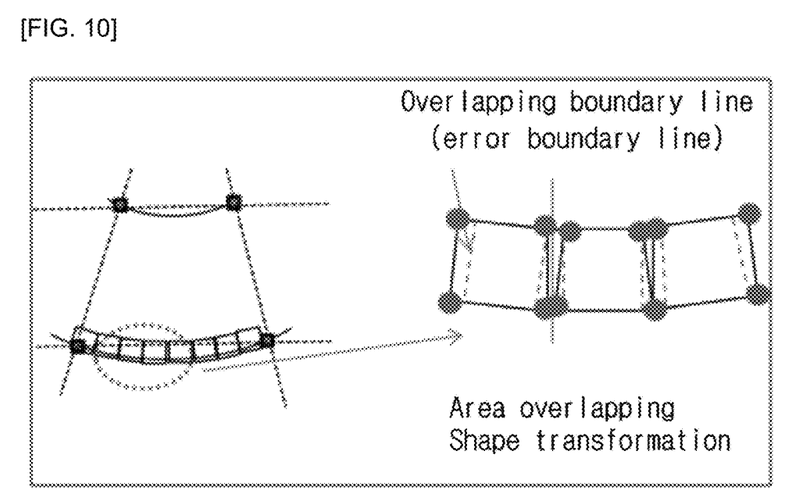
FIG. 10 is an exemplary diagram illustrating a method of configuring partial quadrangles of 3D space grid cells for an object having a curved outline according to an embodiment of the present disclosure.

Referring to FIG. 10, instead of obtaining four coordinates of a curved quadrangle, squares are disposed adjacent to surrounding quadrangles to obtain 3D coordinates of each quadrangle. At this time, the size of the quadrangle can be mixed in different sizes of 10 cm, 1 cm, and 1 mm. In addition, it is possible to generate an object virtually using CAD or another type of 3D object model generation algorithm, and substitute the actual coordinates to coordinates of inner edges of the polygon using a grid matching model.

Figure 7:
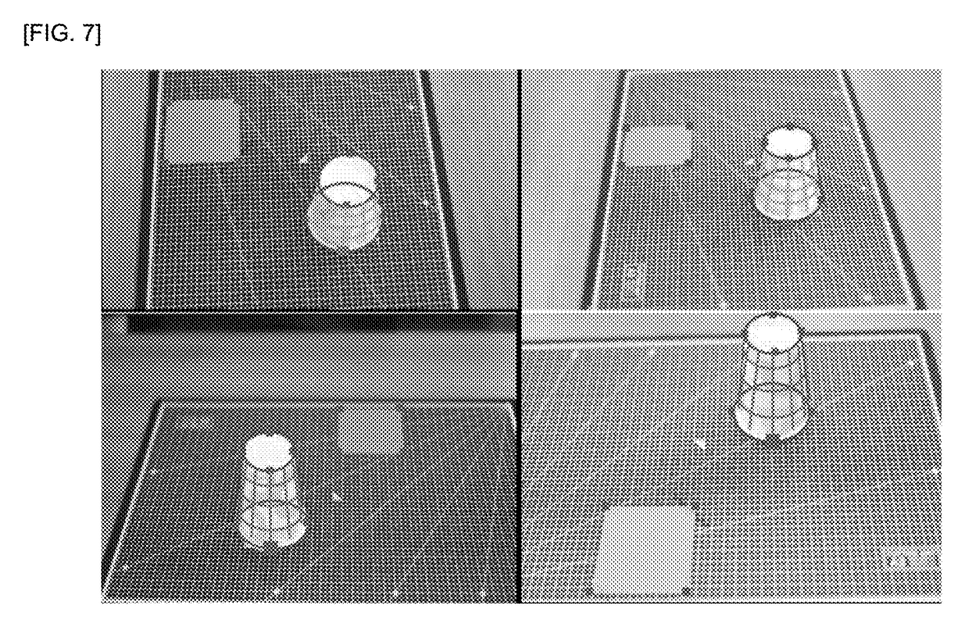
FIG. 7 is a diagram illustrating a case where vertical or horizontal grids are derived from 3D grids to be applied to a cross section of an object according to an embodiment of the present disclosure.

Referring back to FIG. 5, object 3D shape information is generated using polygon data from images captured in multiple directions (S530). That is, as in an example of FIG. 7, an object is captured from distances in various directions with a camera, and the actual 3D coordinates of each part are generated from the captured image using a grid model and attached to previously created data. In this way, it is possible to obtain coordinates of the polygonal quadrangle on the object opposite to the XYZ axes, which are not visible in one image, and to secure the accuracy much better than that of one image. In addition, it is possible to construct information on the object expressed in any direction when this invisible part is captured to create a polygon based on the actual distance standard, and to predict the invisible part like a human even if the artificial intelligence matches and recognizes a 3D of only the visible part.

The method for generating the 3D entity shape data using image recognition according to the present disclosure described above can be implemented as computer-readable codes on a computer-readable recording medium. The computer readable recording medium includes all kinds of recording media storing data which may be deciphered by a computer system. For example, the recording media may include a read only memory (ROM), a random access memory (RAM), a magnetic tape, a magnetic disk, a flash memory, an optical data storage device, etc. Further, the computer readable recording media may be stored and executed as codes which may be distributed in the computer system connected via a computer communication network and read by a distribution method.

As described above, the present disclosure has been described with reference to the preferred embodiments. However, it will be appreciated by those skilled in the art that various modifications and changes of the present disclosure can be made without departing from the spirit and the scope of the present disclosure which are defined in the appended claims.

What is claimed is:

1. A method for generating 3D entity shape data using image recognition which is performed by a computing device, the method comprising:
   recognizing a grid matching part having four edge vertices of a quadrangle displayed in an image captured by a camera;
   generating a cube-shaped 3D space grid of a specific distance unit applied to the image by using the grid matching part; and generating shape data for an external object using the 3D space grid,
wherein a virtual grid on a plane of a specific distance is first generated by using the grid matching part, and the 3D space grid is generated by matching a lower surface of a virtual 3D grid having a plurality of cubes with the virtual grid.

2. The method of claim 1, wherein the grid matching part is formed in a 3D shape having three axes x, y, and z, and the 3D space grid is generated by matching one cube of the virtual 3D grid with the grid matching part.

3. The method of claim 1, wherein the generating of the shape data for the external object includes
obtaining real coordinates, sizes, and distances of feature points of a main outline of the object by using the 3D space grid; and
generating a small quadrangular grid (polygon) on the object surface by using the coordinates of the feature points of the main outline.

4. The method of claim 3, wherein when the outline of the object is curved, a smaller quadrangular grid is generated.

5. The method of claim 4, further comprising:
generating each set of points expressed as a quadrangle or more grid (polygon) object having the same distance of a small side on the object surface by using the coordinates of the feature points of the main outline obtained by using the 3D space grid in each of images captured in two or more points to complete an invisible part by attaching the generated sets using a real coordinate.

6. The method of claim 4, wherein a 3D coordinate is completed by generating a virtual planar grid that vertically or horizontally cuts the cross section of the object where feature points of the main outline of the object are located, and obtaining the coordinates of the virtual planar grid.

7. An apparatus for generating 3D entity shape data using image recognition, the apparatus comprising:
a processor; and
a memory connected to the processor,
wherein the memory stores program instructions executable by the processor to recognize a grid matching part having four edge vertices of a quadrangle displayed in an image captured by a camera, generate a cube-shaped 3D space grid of a specific distance unit applied to the image by using the grid matching part, and generate shape data for an external object using the 3D space grid, generate first a virtual grid on a plane of a specific distance by using the grid matching part, and generate the 3D space grid by matching a lower surface of a virtual 3D grid having a plurality of cubes with the virtual grid.

* * * * *